United States Patent

Sheehan

[11] Patent Number: 5,912,431
[45] Date of Patent: *Jun. 15, 1999

[54] SNAP-IN LOCKNUT ADAPTER FOR CONNECTORS

[76] Inventor: Robert K. Sheehan, 571 Rollingrock La., Cincinnati, Ohio 45255

[*] Notice: This patent issued on a continued prosecution application filed under 37 CFR 1.53(d), and is subject to the twenty year patent term provisions of 35 U.S.C. 154(a)(2).

[21] Appl. No.: 08/728,434

[22] Filed: Oct. 9, 1996

Related U.S. Application Data

[63] Continuation of application No. 08/173,556, Dec. 27, 1993, abandoned.

[51] Int. Cl.$^6$ ............................................. H02G 3/18
[52] U.S. Cl. ............................................. 174/65 R
[58] Field of Search ................... 174/65 R, 65 SS, 174/151; 248/56; 285/158, 162, 139.1

[56] References Cited

U.S. PATENT DOCUMENTS

| | | | |
|---|---|---|---|
| 3,300,163 | 1/1967 | Randolph | 248/56 |
| 3,321,219 | 5/1967 | Sebo | 285/161 |
| 3,749,424 | 7/1973 | Greene | 285/139.1 |
| 4,144,403 | 3/1979 | Akita et al. | 174/65 R X |
| 4,234,218 | 11/1980 | Rogers | 285/162 |
| 4,302,035 | 11/1981 | Ochwat | 285/158 |
| 4,366,344 | 12/1982 | Sheehan | 174/65 R |
| 4,468,535 | 8/1984 | Law | 174/65 R |
| 4,494,779 | 1/1985 | Neff et al. | 285/159 |
| 4,619,332 | 10/1986 | Sheehan | 174/65 R |
| 4,652,018 | 3/1987 | Boghosian | 285/12 |
| 4,653,835 | 3/1987 | Schulte et al. | 439/557 |
| 4,861,279 | 8/1989 | Sheehan et al. | 439/412 |
| 4,990,721 | 2/1991 | Sheehan | 174/65 R |
| 5,068,496 | 11/1991 | Favalora | 174/65 R |
| 5,132,493 | 7/1992 | Sheehan | 174/65 R |
| 5,171,164 | 12/1992 | O'Neil et al. | 439/552 |
| 5,189,258 | 2/1993 | Pratesi | 174/65 R |
| 5,200,575 | 4/1993 | Sheehan | 174/65 R |

OTHER PUBLICATIONS

Three page document entitled Tinnerman Special Nut Brand Fasteners, pp. 42 & 43, Cleveland, Ohio, circa 1970.
Brochure *Arlington Industries, Inc. "Just Add Cable"*, 1993.
Insulating Busihngs, *Alliance Plastics*, p. 3, 1993.

*Primary Examiner*—Dean A. Reichard
*Attorney, Agent, or Firm*—Dinsmore & Shohl LLP

[57] ABSTRACT

A snap-in locknut adapter is shown for connectors having a flange adjacent a threaded distal end to be inserted through an opening of predetermined diameter in a bulkhead. The adapter is to include a body with front and rear ends, an outer surface, and a hollow interior portion having internal threads corresponding to the threaded distal end of the connector. At least a portion of the outer surface of the body is to have an effective outer diameter less than the predetermined diameter of the opening. The adapter also includes a plurality of peripherally spaced, displaceable snap-lock members which extend outwardly from the outer surface of the body and have an effective outer diameter larger than the predetermined diameter of the opening. Once the displaceable snap-lock members are displaced inwardly and pushed through an opening in a bulkhead, they assume their original shape to thereby resist removal of the adapter from the opening. The adapter also preferably includes integrally formed areas which facilitate tightening of the adapter on the threaded distal end of the connector once the snap-lock members have been snapped through the opening. In this way, the adapter ensures that the connector is drawn into intimate contact with the bulkhead.

28 Claims, 2 Drawing Sheets

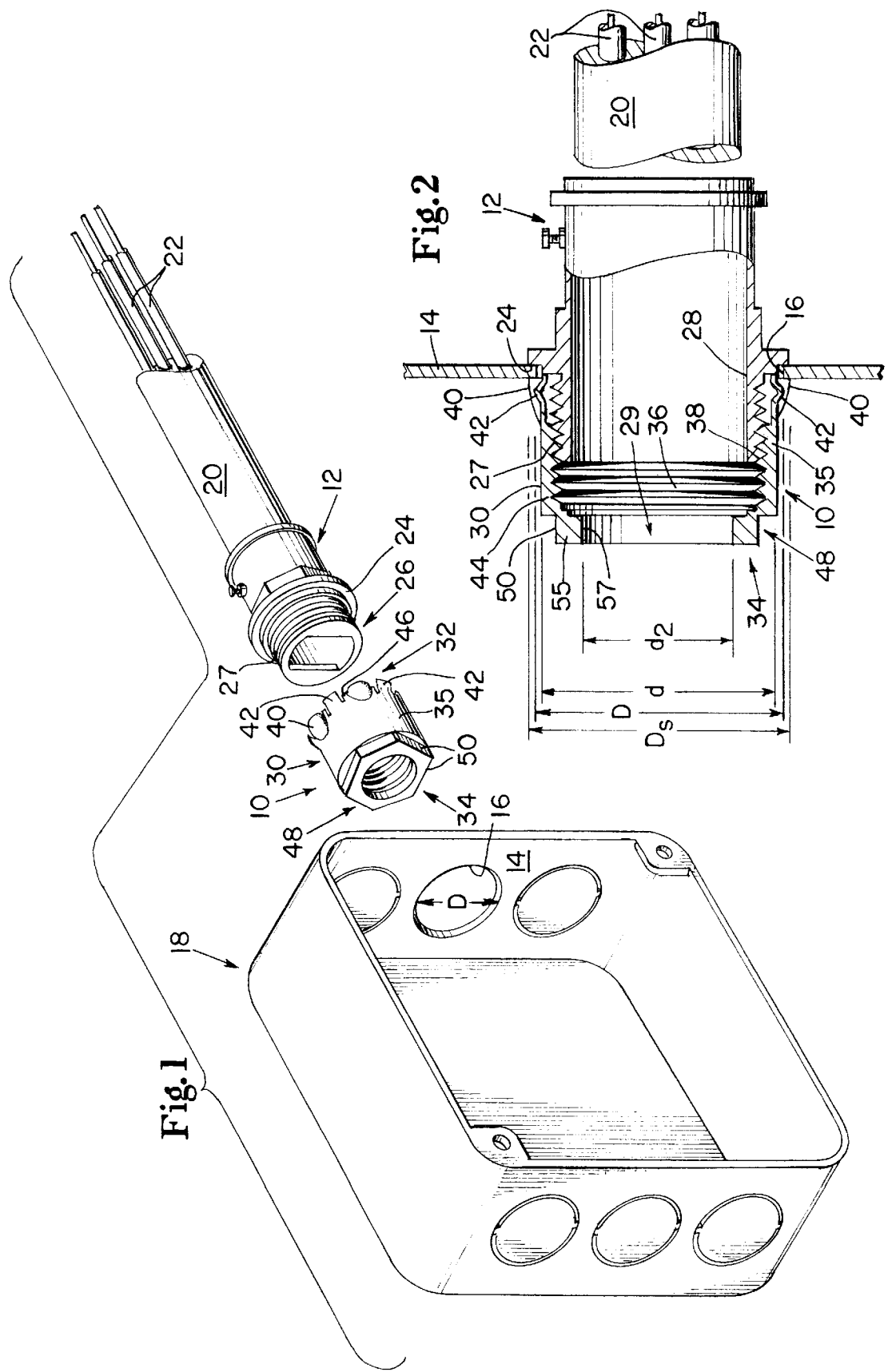

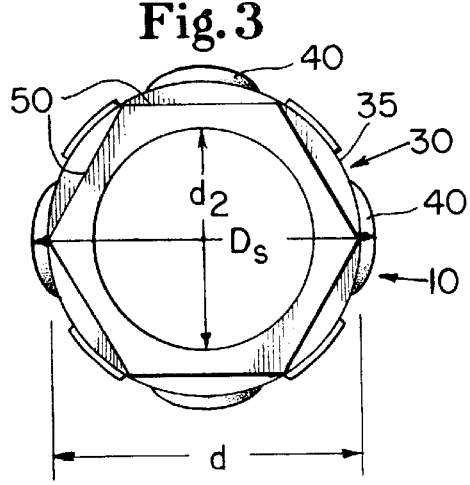
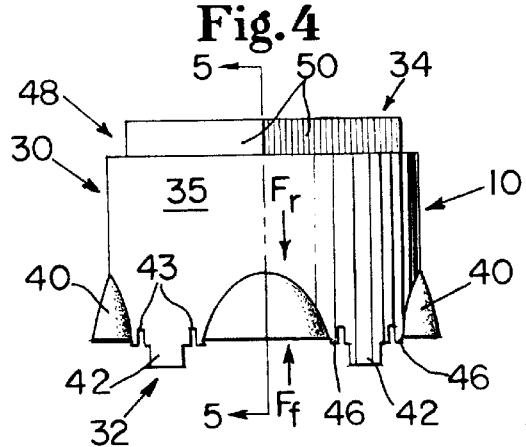
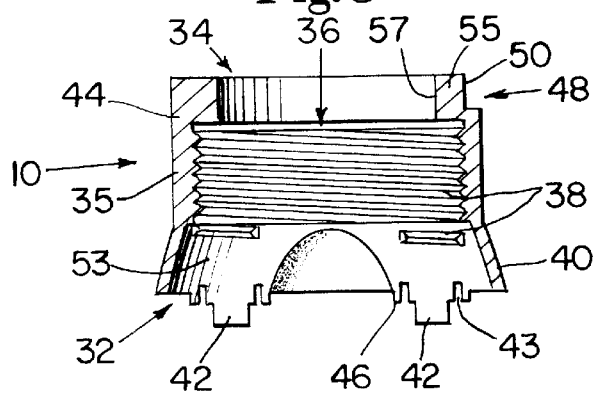
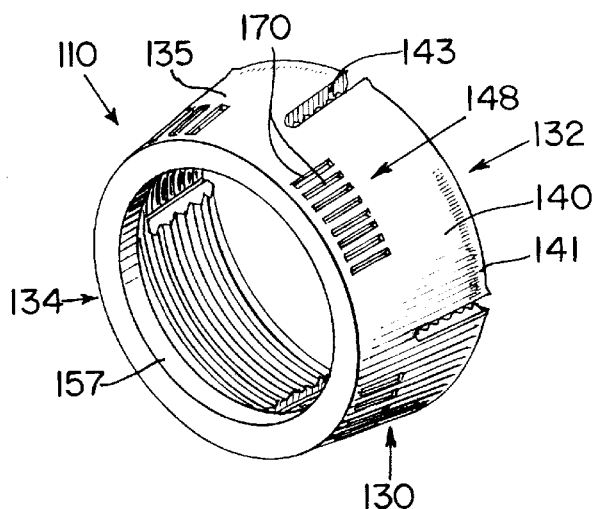
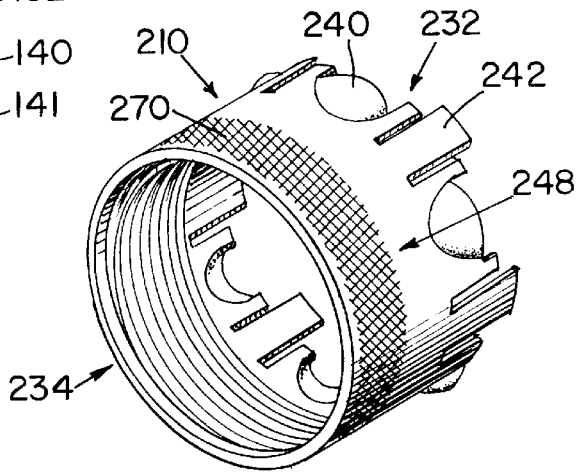

SNAP-IN LOCKNUT ADAPTER FOR CONNECTORS

This is a continuation, of application Ser. No. 08/173,556, filed Dec. 27, 1993 now abandoned.

TECHNICAL FIELD

This invention relates to adapters for connecting devices having a flange and a threaded portion to be installed through the opening in a wall or other bulkhead for tight connection therewith, and, more particularly, to a threaded snap-in locknut adapter which can be pre-assembled on the threaded end of a connector device to minimize installation labor requirements, while ensuring a quick, reliable, and tight snap-in connection of a connector in the opening of a bulkhead, such as electrical connectors for junction boxes and the like.

BACKGROUND ART

There are a number of situations where connectors are utilized to attach conduits, cables, pipes, and other elements to other members such as junctions, enclosures, controls, switches, and the like. A very common example where connectors are used is in conjunction with electrical wire conduit and tubing, and electrical boxes, junction boxes, fuse boxes, and other types of electrical enclosures and control units. Flexible and rigid conduit, cables, cords, tubing, pipes and other mentioned electrical devices providing distribution networks for electrical power are quite familiar as used in both industrial and residential construction. In accordance with building codes and safety regulations, connectors must be firmly and reliably attached to any of a variety of relatively standard sized openings or "knockouts" in electrical boxes, walls, control units, junction boxes and the like. As used herein, the term "bulkhead" will connote any wall or enclosure structure in which is provided an opening for attachment of a connector device.

Connectors of this type often include a threaded forward end which is inserted through the opening in the bulkhead during connection procedures, and, thereafter, a locknut is threaded on to the distal end of the connector and tightened against the inner surface of the bulkhead. Such threaded connection is, however, relatively labor intensive, and often difficult to accomplish in a uniform and reliable manner. In many applications, it is also imperative that the connector be intimately connected to the bulkhead to ensure continuity of an electrical circuit, water tight protection, and/or integrity of the connected parts. As illustrated in U.S. Pat. No. 5,189,258, which issued to E. Pratesi, conventional connectors are generally located with their threaded portion received in the opening of a bulkhead, and, thereafter, a threaded nut or ring is screwed onto the threaded portion of the body drawing the flange up against the electrical housing or the like. Tightening of the ring is usually accomplished by the use of a screwdriver and hammer, and the threaded ring usually comprises a plurality of angled tabs which serve to lock the nut in place once properly tightened.

In use, however, such connector arrangements usually require the pre-assembly of the connector and its threaded locknut during the manufacturing process, disassembly of the threaded ring from the connector prior to installation use, then reassembly of the ring onto the threaded end of the connector once it has been inserted through an opening in an electrical box or the like. Reassembly of these pieces is often complicated by wires, cables, and other elements in the relatively confined spaces within electrical boxes, junction boxes and the like. The assembly, disassembly, and later reassembly and tightening operations increase the labor, time, and overall costs of utilizing these devices. The difficulty in ensuring the proper tightening of the locking ring can also increase the chances of loose connections and/or less than reliable continuity through such connections.

These problems and shortcomings have persisted through the years, in spite of numerous attempts to provide improved connectors and adapter devices for connectors. For example, the Pratesi patent mentioned above pertains to a retaining clip which is to be used with strain relief connectors on electrical boxes. The Pratesi device is taught as being formed from a stamped sheet of annealed steel, then formed into a ring-like shape to encompass the threaded end of a connector. The retaining clip is to be attached to the threaded connector without threading (i.e., it is to be pressed onto the threaded end of the connector via a sliding operation). The clip includes a series of engagement tabs along a peripheral edge which have grooves configured to cross-thread with the corresponding threads of the connector. The connector and clip assembly are inserted into the opening of an electrical box, and the spring tabs of the clip spring open to engage the interior of the box surface in use. Due to tolerances in openings in various electrical boxes and the like, however, the fit between this spring clip, the opening, and the threaded end of the connector can vary between applications. Because the clip itself becomes part of the electrical circuit, it is imperative that an intimate fit be provided between all of these parts. The Pratesi device inherently depends upon the spring action of the clip to provide continuity between varying gaps which are inherently present between the connector and the opening of the electrical box. It has been found that such connections can be relatively loose, enabling "hotspots" to be established in use, and resulting in potentially unsatisfactory connection/continuity conditions. Because uniformity and reliability of connections in applications such as electrical installations is critical to maintain safe and dependable connections, loose fittings and/or hotspots are unacceptable in many applications.

Similarly, U.S. Pat. No. 5,171,164, which issued to D. O'Neil et al., also contemplates a stamped steel spring metal adapter for electrical connectors. The O'Neil et al. spring steel adapter requires a specially adapted smooth central section (32) between the flange (28) and raised shoulder (30) of a connector, thereby limiting the connectors upon which the adapter can be used to those which have been specially designed therefor. In fact, this adapter is not particularly applicable to standard threaded connectors without substantial structural changes. Moreover, like the Pratesi retaining clip, the O'Neil adapter relies upon its spring metal characteristics for accommodating inherent tolerances between the opening into which the connector is to be attached, and the connector itself. Consequently, in addition to requiring special adaptations of the connector itself for receiving the O'Neil device, some applications will inherently result in reliance on the adapter itself as part of an electrical path of continuity. As mentioned above, where the adapter is part of an electrical circuit, looseness and resulting hotspots are quite undesirable.

Other specially designed connector assemblies for conduit and the like have been successfully provided for convenient snap-in connection arrangements in certain circumstances. For example, U.S. Pat. No. 5,200,575, which issued to the present inventor, provides a very reliable snap-in type connector assembly for applications requiring fluid-type connections. However, there remains an unfulfilled need to provide a generally universal applicator which can be used in conjunction with standard threaded connectors without requiring structural changes in the connectors themselves. Additionally, such an adapter which can be assembled with the threaded connector during the manufacturing process, and then shipped and used as a single assembly without requiring additional disassembly and reassembly operations has been heretofore unavailable. Similarly, such an adapter including means for facilitating tightening of the connector against a bulkhead to ensure a snug fit and continuity between connector and bulkhead once snapped into place have thus far been unavailable for use with common threaded connectors in the industry.

DISCLOSURE OF THE INVENTION

It is an object of this invention to address and overcome the above-described problems and shortcomings of adapter devices for connectors which have heretofore been available in the industry.

It is also an object of this invention to provide an improved snap-in locknut adapter for connectors which can be used in conjunction with a variety of commonly available threaded connectors without requiring structural changes to those connectors.

It is another object of the present invention to provide a snap-in locknut adapter for connectors which can be used to convert standard threaded connectors into convenient snap-in assemblies, and which are further designed for facilitating tightening of the connector to the bulkhead once snapped into connected condition.

It is yet another object of the present invention to provide a substantially universal snap-in locknut adapter for threaded connectors which essentially converts standard threaded connectors into one piece snap-in assemblies which also ensure intimate reliable direct contact between the connector and the electrical box or other bulkhead to which it is attached.

It is also an object of this invention to provide an improved snap-in locknut adapter for threaded connectors which preferably includes an integral insulated throat which, in use, prevents significant contact between cable or other items passed through the connector, with the distal opening of the connector, in order to obviate undesirable degradation or chaffing of such cable.

It is yet another object of the present invention to provide a snap-in adapter for threaded connectors which preferably includes a plurality of flexible fingers or tabs for preliminarily aligning the connector with the opening of an electrical box or bulkhead in order to optimize the contact between the connector and the bulkhead.

In accordance with one aspect of the present invention, there is provided a snap-in locknut adapter for connectors having a flange adjacent a threaded distal end to be inserted through an opening of predetermined diameter in a bulkhead. The adapter is to include a body with front and rear ends, an outer surface, and a hollow cylindrical interior portion having internal threads corresponding to the threaded distal end of the connector. At least a portion of the outer surface of the body is to have an outer diameter less than the predetermined diameter of the bulkhead opening. The adapter also includes a plurality of peripherally spaced, displaceable snap-lock members which extend outwardly from the outer surface of the body and which have an effective outer diameter larger than the predetermined diameter of the opening. Once the displaceable snap-lock members are displaced inwardly and pushed through an opening in a bulkhead, they assume their original shape to thereby resist removal of the adapter from the opening. The adapter also preferably includes integrally formed areas which facilitate tightening of the adapter on the threaded distal end of the connector once the snap-lock members have been snapped through the opening. In this way, the adapter ensures that the connector is drawn into intimate contact with the bulkhead. In a preferred embodiment, these areas are provided in the form of a nut-like hexagonal conformation adjacent the rear end of the adapter for receiving common tools.

In a preferred embodiment, the locknut adapter also includes an extended sleeve portion adjacent its rear end which extends beyond the distal end of the connector, in use, to provide an insulated sleeve thereover. This insulated sleeve also preferably also includes an insulated throat which provides a relatively smooth insulated surface adjacent the distal end of the connector to prevent undesirable chaffing of electrical wires or other elements passed through the connector. To prevent significant contact between electrical cable or other items passed through the internal opening of the connector, the throat preferably features an inner diameter which is slightly smaller than the internal opening and the distal end of the connector, thereby providing the insulated surface to protect wires and the like from undesired degradation.

In a preferred embodiment, the locknut adapter also includes a plurality of flexible fingers or tabs which extend outwardly from the front end of the adapter which facilitate preliminary alignment of the connector/adapter assembly relative to the opening in the bulkhead. By ensuring that the connector is substantially centered within the opening prior to tightening procedures, a more uniform and reliable intimate contact between the connector and the bulkhead is facilitated.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 1 is a partial perspective view of an illustrative example of an electrical connector/electrical box application of the present invention, wherein a portion of an electrical conduit is shown as attached to the rear portion of a connector, and a snap-in locknut adapter of the present invention is shown removed from the threaded end of the connector for clarity. In use, the snap-in locknut adapter is threaded onto the connector prior to snap-in connection with a knock-out opening of the electrical box;

FIG. 2 is a partial, cross-sectional view of an application substantially as illustrated in FIG. 1, shown after the connector/adapter assembly has been snapped through the opening in bulkhead and tightened into position;

FIG. 3 is a rear end view of a preferred embodiment of a snap-in locknut adapter made in accordance with the present invention;

FIG. 4 is a side elevational view of the adapter of FIG. 3;

FIG. 5 is an enlarged, cross-sectional view of the adapter of FIG. 4, taken along line 5—5 thereof;

FIG. 6 is a perspective view of an alternate embodiment of a snap-in locknut adapter of the present invention; and FIG. 7 is a perspective view of a third embodiment of a snap-in locknut adapter of the present invention.

DETAILED DESCRIPTION OF THE INVENTION

Referring now to the drawings in detail, wherein like numerals indicate the same elements throughout the views, FIG. 1 shows an exemplary application in which a snap-in locknut adapter 10 of the present invention might be advantageously utilized to convert a standard threaded connector 12 for snap-in use. While FIG. 1 illustrates the assembly of snap-in locknut adapter 10 and connector 12 prior to insertion of opening 16 of electrical box 18, FIG. 2 is a partial cross-sectional view of such an assembly after it has been snapped into position and tightened against the bulkhead, as will be described herein. FIGS. 3–5 provide additional detail of a preferred embodiment of the snap-in locknut adapter 10 made in accordance with the present invention.

As illustrated in FIGS. 1–5, a preferred snap-in locknut adapter 10 will preferably comprise a substantially continous and undivided body 30 having oppositely disposed front and rear ends 32 and 34, respectively, an outer surface 35, and a hollow generally cylindrical interior portion 36. Within hollow interior portion 36 there are preferably provided a plurality of internal threads 38 which will be designed to correspond with and threadably engage external threads (e.g., 27) of the threaded distal end 26 of a connector (e.g., 12). As best seen in FIGS. 2 and 5, the internal threads 38 may extend along a significant portion of interior 36 to enable adapter 10 to conform to a wide variety of threaded connectors available in the industry. While it is preferred that outer surface 35 exhibit a generally cylindrical outer conformation, as will be noted below, it is preferred that at least a portion of the adapter be configured to provide means (e.g., 48) for facilitating the tightening of the adapter on the threaded distal end of the connector in use. As best illustrated in FIGS. 1, 3 and 4, a preferred means 48 for facilitating tightening of the adapter comprises a plurality of flat portions 50 which can be provided in the form of a nut-like hexagonal shape for receiving a wrench or the like. As best seen in the alternate embodiment of FIG. 7, means 248 for facilitating tightening can comprise other structures such as knurling, or ribs (e.g., 270).

It is also imperative that at least a portion of outer surface 35 have an effective outer diameter (e.g., d) which is less than the predetermined diameter D of opening 16 (e.g., a knockout in an electrical box) so that the adapter can be at least partially snapped through such opening in use. As seen in FIGS. 1–3, opening 16 of bulkhead 14 has a predetermined diameter of D, while the effective outer diameter of outer surface 35(d) is slightly less than diameter D. For example, with respect to metallic outlet boxes, standard knockout diameters are specified within acceptable tolerance ranges (e.g., for ½ inch connectors, the acceptable range of diameter D of the knockout is 0.860 to 0.906 inches (21.85 to 23.02 mm). The term "effective diameter" is used herein to highlight the fact that the conformation of outer surface 35 need not be truly cylindrical, and the relative sizes of the "diameters" discussed herein are important merely to ensure the proper function of the snap-in and locking features of the present invention.

Adjacent front end 32 of body 30 are a plurality of peripherally spaced and radially displaceable snap-lock members 40, which are preferably provided in the form of outwardly extending conical-shaped protrusions integrally formed with body 30. As will be appreciated, the outwardly convex, thin-walled nature of snap-lock members 40 enable these members to be radially displaceable when urged inwardly from a rearward direction (e.g., see direction of force $F_r$ in FIG. 4), are relatively strong and rigid against displacement or other movement or forces from a frontal direction (e.g., forces $F_f$ as illustrated in FIG. 4). In this way, snap-lock members 40 can assume a normal configuration having an effective diameter (e.g., $D_s$) which is greater than the diameter D of bulkhead opening 16 into which a connector is to be attached.

Snap-lock members 40 can, however, be inserted through the smaller opening 16, as they are inwardly displaced as the rear end 34 is inserted thereinto. Once snap-lock members 40 are inwardly displaced, they will automatically return to their originally, outwardly extended configuration with a "snapping" action as their forwardmost edges are pushed through opening 16. As seen in FIG. 2, snap-lock members 40 resiliently return to their extended position to prevent withdrawal of adapter 10 and its threaded connector 12. In this regard, it will be understood that while adapter 10 can be manufactured from a relatively wide variety of materials including plastic, metal, nylon, or other appropriate materials, plastic is preferred for applications in which the insulating advantages of the present invention may be desirable.

As will be appreciated, one of the advantages of the adapter of the present invention is that it can be pre-assembled on a connector (e.g., 12) during the manufacturing process. Particularly, adapter 10 is preferably threadably attached with its front end 32 oriented inwardly toward the outward extending flange (e.g., 24) of connector 12 for shipping and, eventual use. In assembled condition, the adapter and connector assembly is ready for immediate use without a need for disassembly for insertion of the connector into an electrical box knockout or the like. As best seen in FIGS. 2 and 5, body 30 of adapter 10 preferably comprises an extended portion or sleeve (44) adjacent rear end 34, which extends beyond the threaded distal end (e.g., 26) of a connector in use. Extended portion 44 provides an effective insulated sleeve over the threaded distal end of a connector, which can be a valuable feature where continuity is maintained between a bulkhead and the connector. While it is contemplated that most all connectors will include a substantially hollow internal opening (e.g., 28) through which cables, wires (e.g., 22) or other items will be passed, it is also preferred that the extended portion or sleeve 44 of body 30 further comprise a hollow interior (e.g., 36) substantially aligned with the hollow internal opening of the connector. Moreover, it is preferred that an insulated throat (e.g., 55) adjacent rear end 34 be included as part of adapter 10 to provide a relatively smooth insulated surface (e.g., 57) which will be situated inwardly and adjacent the distal open edge 29 of connector 12 in use.

As best illustrated in FIG. 2, it is preferred that the insulated throat 55 be provided with its smooth insulated surface 57 having an effective opening of diameter $d_2$. Because the distal edges (e.g., 29) of connectors can often be relatively rough, the provision of a relatively smooth surface (e.g., 57) adjacent that edge can be helpful in preventing significant contact between wires (e.g., 22), cable or other items passed through the connector in use, and can prevent undesirable chaffing and other damage to insulated wires and the like. The effective opening size or diameter $d_2$ of insulated surface 57 can preferably be slightly smaller than the opening size of distal edge 29, thereby acting as an inwardly situated protective bushing or grommet adjacent that edge.

As best seen in FIGS. 4 and 5, the interior surface of locknut adapter 10 includes a relatively smooth non-threaded or recessed area 53 adjacent its front end 32 to provide an effective ramp or lead-in area to facilitate initial telescoping of adapter 10 over the threaded distal end 26 of a connector, and initiation of the threaded interaction therewith. It is also in this area that the outwardly extending snap-lock members 40 are preferably formed, along with a plurality of forwardly extending optional fingers 42 and tabs 46 along the front most edge thereof. Fingers 42 are preferably flexible in nature, and extend forwardly beyond the snap-lock members 40 to preliminarily space adapter 10 on a connector 12 at a sufficient distance from flange 24 to accommodate even the thickest of standard electric box wall thicknesses or similar bulkhead thicknesses. Fingers 42 are also preferably connected to body 30 in conjunction with longitudinal slots 43, which help facilitate and enable fingers 42 to flex rearwardly as adapter 10 is tightened on connector 12 after insertion into an opening or knockout (16) of a bulkhead 14.

This rearward flexing is best illustrated in FIG. 2. Particularly, if the thickness of a bulkhead 14 is less than the length of flexible fingers 42, the fingers 42 will displace or "buckle" rearwardly and outwardly as adapter 10 is tightened on the connector. The flexibility of fingers 42 also allows the connector and bulkhead to be brought into intimate contact with each other by tightening of adapter 10 onto connector 12 following the snap-through connection procedures. As shown in FIG. 2, the distal ends of fingers 42 will generally remain within opening 16 and between connector 12 and such opening.

A plurality of smaller or shorter tabs 46 are also preferably provided along the front periphery of body 30, and situated on opposite sides of each of the conical snap-lock members 40. Tabs 46 will generally remain sandwiched between connector 12 and bulkhead opening 16 in use to help center connector 12 therewithin. It has also been found that tabs 46 help to minimize "slack" or "play" which can result from manufacturing tolerances of standard connectors and knockout openings of bulkheads and the like. As mentioned above, while there are standard diameter measurements of knockout sizes, for example, in the electrical industry, each of these sizes has acceptable tolerances which can result in relative discrepancies between parts. By minimizing these tolerance differences with inserted tabs 46, a more snug and reliable fit is ensured, and connector pull-out resistance can also be enhanced. As will be understood, connectors utilized with the adapters of the present invention must comply with all applicable codes and testing requirements, such as the National Electric Code and Underwriters Laboratory tests for electrical connectors and the like.

In use, a user need only insert the rear end 34 of an adapter/connector assembly, as illustrated in FIG. 1 into an appropriate sized knockout (e.g., opening 16 of bulkhead 14). As the connector is inserted into the opening, snap-lock members 40 of adapter 10 are displaced radially inwardly until they pop through opening 16 with a snap-like characteristic. Thereafter, the user tightens adapter 10 by rotating the same relative to connector 12, thereby drawing flange 24 of the connector tightly and intimately against the surface of bulkhead 14. Nut-like hex area 48 can enable use of pliers, wrenches or the like for tightening procedures. As will be appreciated, adapter 10 creates the holding force locking connector 12 to bulkhead 14, but the continuity of any electrical circuit or the like is maintained directly between flange 24 and bulkhead 14 (not via adapter 10). Conduit (e.g., 20), tubing or the like can be attached to connector 12 either before or after connection of the assembly to the bulkhead opening.

FIG. 6 illustrates another embodiment of an adapter made in accordance with the present invention. Particularly, adapter 110 comprises a generally cylindrical outer surface 135 with front and rear ends 132 and 134, respectively. Means 148 for facilitating tightening of the adapter are provided in the form of ribs or knurling 170, as opposed to the hexagonal nut-like flat areas 50 described with respect to the first embodiment. Actual tightening can be accomplished by manual manipulation and by application of tools to the ribs, knurling, nut-like hex, or the like. An insulated throat having the relatively smooth surface 157 is similarly provided adjacent rear end 134. Most significantly, snap-lock members 140 are provided in the form of outwardly angled resilient flaps which can be inwardly displaced during insertion procedures. The outward bias of flaps 140 ensures that adapter 110 will strongly resist removal once snapped through an opening in the bulkhead, and can be provided with a locking ring 141 to further prevent such withdrawal.

FIG. 7 similarly shows a perspective view of yet another embodiment of the present invention. Snap-in locknut adapter 210 is substantially the same as adapter 10 described above, with the exception that rear end 234 has been modified to eliminate portions of the extended portion of sleeve (e.g., extended portion 44 described above), as well as the insulated throat and insulated surface (e.g., throat 55 and surface 57) described with respect to the first embodiment. While the simplified structure of adapter 210 could still provide a protective insulated sleeve over the threaded distal end of a connector, the protective bushing or grommet aspect of the first embodiment is eliminated from this particular structure. Adapter 210 is also provided with knurling or ribs 270 as the means 248 for facilitating tightening of the adapter after snap-through procedures in use.

Having shown and described the preferred embodiments of the present invention, further adaptions of the snap-in locknut adapter described herein can be accomplished by appropriate modifications by one of ordinary skill in the art without departing from the scope of the present invention. Several of these potential modifications have been mentioned, and others will be apparent to those skilled in the art. Accordingly, the scope of the present invention should be considered in terms of the following claims, and is understood not to be limited to the detail of structure and operation shown and described in the specification and drawings.

I claim:

1. A snap-in locknut adapter for providing quick and reliable connection of a connector member to an opening of predetermined diameter in a bulkhead, wherein said connector member comprises a flange adjacent a threaded distal end to be inserted through said opening, said adapter comprising:

a body having oppositely disposed front and rear ends, an outer surface, and a hollow interior portion with internal threads for threaded interaction with said threaded distal end of said connector member, said body provided in a substantially continuous and undivided form at least adjacent its rear end, and at least a portion of said outer surface having an outer diameter which is less than said predetermined diameter of said opening; and a plurality of peripherally spaced displaceable snap-lock members extending outwardly from the outer surface of said body adjacent the front end, said snap-lock members adapted to remain displaceable after said front end is assembled on said connector member and having an effective outer diameter larger than said predetermined diameter of said opening to resist removal of said adapter from said opening once snapped therethrough.

2. The snap-in locknut adapter of claim 1, further comprising at least one tab along the front end and adjacent at least one of the snap-lock members.

3. A snap-in locknut adapter for providing quick and reliable connection of a connector member to an opening of predetermined diameter in a bulkhead, wherein said connector member comprises a flange adjacent a threaded distal end to be inserted through said opening, said adapter further comprising:

a substantially continuous and undivided body having oppositely disposed front and rear ends, an outer surface, and a hollow interior portion with internal threads for threaded interaction with said threaded distal end of said connector member, at least a portion of said outer surface having an outer diameter which is less than said predetermined diameter of said opening;

a plurality of peripherally spaced displaceable snap-lock members extending outwardly from the outer surface of said body, said snap-lock members having an effective outer diameter larger than said predetermined diameter of said opening to resist removal of said adapter from said opening once snapped therethrough; and a plurality of spaced fingers extending forwardly from said front end of said body.

4. The snap-in locknut adapter of claim 3, wherein said fingers are flexible, are spaced about a peripheral front edge of said front end, and extend outwardly therefrom for preliminarily radially aligning said connector and adapter within said predetermined diameter of the opening in the bulkhead.

5. A snap-in locknut adapter for providing quick and reliable connection of a connector member to an opening of predetermined diameter in a bulkhead, wherein said connector member comprises a substantially hollow opening through which cable and other items can be passed and a flange adjacent a threaded distal end which will be inserted through said opening in use, said adapter comprising:

a body having oppositely disposed front and rear ends, an outer surface, and a hollow interior portion with internal threads for threaded, telescoping interaction with said threaded distal end of said connector member, said outer surface having an effective outer diameter which is less than said predetermined diameter of said opening;

a plurality of peripherally spaced displaceable snap-lock members extending outwardly from the outer surface of said body, said snap-lock members having an effective outer diameter larger than said predetermined diameter of said opening to resist removal of said adapter from said opening once snapped therethrough; and an insulated throat adjacent said rear end and extending inwardly to provide a relatively smooth insulated surface adjacent said distal end of the connector once said adapter is threadedly engaged thereon.

6. The snap-in locknut adapter of claim 5, wherein said body further comprises an extended portion adjacent said rear end of said body which extends beyond the threaded distal end of said connector in use to provide an insulated sleeve thereover.

7. The snap-in locknut adapter of claim 5, wherein the hollow opening of said connector has a predetermined effective inside diameter, and said insulated surface of said throat has an inner diameter which is smaller than said effective inside diameter.

8. The snap-in locknut adapter of claim 5, further comprising means for facilitating tightening of the adapter on said threaded distal end of said connector after said snap-lock members have been snapped through said opening, thereby drawing said flange of said connector into intimate contact with said bulkhead.

9. The snap-in locknut adapter of claim 5, further comprising at least one tab along the front end and adjacent at least one of the snap-lock members.

10. The snap-in locknut adapter of claim 5, further comprising a plurality of spaced fingers extending forwardly from said front end of said body.

11. The snap-in locknut adapter of claim 10, wherein said fingers are flexible, are spaced about a peripheral front edge of said front end, and extend outwardly therefrom for preliminarily radially aligning said connector and adapter within said predetermined diameter of the opening in the bulkhead.

12. The snap-in locknut adapter of claim 5, further comprising two or more substantially flat surfaces associated with said outer surface for tightening the adapter on said threaded distal end of the connector after the snap-lock members have been snapped through an opening.

13. The snap-in locknut adapter of claim 12, wherein said flat surfaces are provided in the form of a multi-faced nut-like conformation formed adjacent said rear end of said body.

14. A method for quickly and snugly connecting a connector member to an opening of predetermined diameter in a bulkhead, wherein said connector member has a substantially hollow opening through which cable and other items can be passed, and a flange adjacent a threaded distal end which will be inserted through said opening in use, said method comprising the following steps:

providing a snap-lock adapter comprising a body having oppositely disposed front and rear ends, an outer surface, and a hollow interior portion with internal threads for threaded, telescoping interaction with said threaded distal end of said connector member, said outer surface having an effective outer diameter which is less than said predetermined diameter of said bulkhead opening, a plurality of peripherally spaced displaceable snap-lock members extending outwardly from the outer surface of said body, said snap-lock members having an effective outer diameter larger than said predetermined diameter of said bulkhead opening to resist removal of said adapter from said opening once snapped therethrough;

threadably attaching said adapter onto the threaded distal end of said connector, with the front end of the adapter facing the flange of said connector;

inserting the distal end of said connector and the rear end of the attached adapter through the opening in a bulkhead, thereby displacing said snap-lock members as they are forced through said bulkhead opening; and snapping said adapter into locking engagement with said bulkhead opening by pushing said snap-lock members through said bulkhead opening.

15. The method of claim 14, wherein said adapter comprises one or more spacer fingers located adjacent said front end thereof, and said method includes utilizing the spacer fingers to preliminarily align the connector and adapter relative to the bulkhead opening prior to final tightening of the adapter.

16. The method of claim 14, wherein said adapter comprises an insulated throat adjacent its rear end, and wherein said method comprises situating said insulated throat adjacent the distal end of said connector in use to support and effectively minimize contact of cable and other items to be passed through said connector with the distal end of the connector.

17. The method of claim 14, wherein said adapter is threadably attached to the distal end of said connector as part of the manufacturing assembly process of the connector, whereby each connector is ready for immediate insertion into an opening of a bulkhead.

18. A combination connector and snap-in locknut adapter for providing quick and reliable connection of a connector member to an opening of predetermined diameter in a bulkhead, wherein said connector member comprises a flange adjacent a threaded distal end to be inserted through said opening, said adapter comprising:

a body having oppositely disposed front and rear ends, an outer surface, an extended portion adjacent said rear end of said adapter which extends beyond the threaded distal end of said connector in use to provide an insulated sleeve thereover, and a hollow interior portion with internal threads for threaded interaction with said threaded distal end of said connector member, at least a portion of said outer surface having an outer diameter which is less than said predetermined diameter of said opening; and a plurality of peripherally spaced displaceable snap-lock members extending outwardly from the outer surface of said body, said snap-lock members having an effective outer diameter larger than said predetermined diameter of said opening to resist removal of said adapter from said opening once snapped therethrough.

19. The connector and snap-in locknut adapter of claim 18, wherein said locknut adapter further comprises at least one tab along the front end and adjacent at least one of the snap-lock members.

20. The snap-in locknut adapter of claim 18, wherein said connector includes a substantially hollow internal opening through which cable and other items can be passed, and wherein said extended portion of said adapter comprises a hollow interior substantially aligned with said internal opening of said connector in use and an insulated throat adjacent said rear end to provide a relatively smooth insulated surface adjacent said distal end thereof.

21. The snap-in locknut adapter of claim 20, wherein said insulated surface of said throat has an inner diameter which prevents significant contact between cable or other items passed through said internal opening and the distal end of said connector.

22. A snap-in locknut adapter for providing quick and reliable connection of a connector member to an opening of predetermined diameter in a bulkhead, wherein said connector member comprises a flange adjacent a threaded distal end to be inserted through said opening, said adapter further comprising:

a substantially continuous and undivided body having oppositely disposed front and rear ends, an outer surface, and a hollow interior portion with internal threads for threaded interaction with said threaded distal end of said connector member, at least a portion of said outer surface having an outer diameter which is less than said predetermined diameter of said opening;

a plurality of peripherally spaced displaceable snap-lock members extending outwardly from the outer surface of said body, said snap-lock members having an effective outer diameter larger than said predetermined diameter of said opening to resist removal of said adapter from said opening once snapped therethrough; and means for facilitating tightening of the adapter on said threaded distal end of said connector after said snap-lock members have been snapped through said opening, thereby drawing said flange of said connector into intimate contact with said bulkhead.

23. The combination of claim 22, wherein said means for facilitating tightening of the adapter comprises two or more substantially flat surfaces associated with said outer surface for interaction with a tightening tool.

24. The snap-in locknut adapter of claim 23, wherein said flat surfaces are provided in the form of multi-faced nut-like conformation formed adjacent said rear end of said body.

25. A snap-in locknut adapter and connector combination for providing quick and reliable connection of a connector member to an opening of predetermined diameter in a bulkhead, wherein said connector member comprises a flange adjacent a threaded distal end to be inserted through said opening, and said adapter comprises:

a body having oppositely disposed front and rear ends, an outer surface, and a hollow interior portion with internal threads for threaded interaction with said threaded distal end of said connector member, said body having a substantially continuous and undivided form at least adjacent its rear end, and at least a portion of said outer surface having an outer diameter which is less than said predetermined diameter of said opening; and a plurality of peripherally spaced displaceable snap-lock members extending outwardly from the outer surface of said body adjacent the front end, said snap-lock members adapted to remain displaceable when said front end is assembled on said connector member and having an effective outer diameter larger than said predetermined diameter of said opening to resist removal of said adapter from said opening once snapped therethrough.

26. The combination of claim 25, wherein said body has a substantially continuous and undivided form adjacent both of said front and rear ends.

27. The combination of claim 25, wherein said snap-lock members comprise outwardly angled resilient flaps.

28. The combination of claim 25, wherein said adapter further comprises at least one tab along the front end and adjacent at least one of the snap-lock members.

* * * * *